(12) United States Patent
Berkcan et al.

(10) Patent No.: US 7,111,195 B2
(45) Date of Patent: Sep. 19, 2006

(54) METHOD AND SYSTEM FOR EXTERNAL CLOCK TO OBTAIN MULTIPLE SYNCHRONIZED REDUNDANT COMPUTERS

(75) Inventors: Ertugrul Berkcan, Clifton Park, NY (US); Marc Robert Pearlman, Clifton Park, NY (US); Emad Andarawis Andarawis, Ballston Lake, NY (US); Terry Michael Topka, Scotia, NY (US); Austars Raymond Schnore, Jr., Scotia, NY (US); William James Premerlani, Scotia, NY (US)

(73) Assignee: General Electric Company, Schenectady, NY (US)

( * ) Notice: Subject to any disclaimer, the term of this patent is extended or adjusted under 35 U.S.C. 154(b) by 461 days.

(21) Appl. No.: 10/373,630

(22) Filed: Feb. 25, 2003

(65) Prior Publication Data

US 2003/0212835 A1 Nov. 13, 2003

Related U.S. Application Data

(60) Provisional application No. 60/359,544, filed on Feb. 25, 2002, provisional application No. 60/438,159, filed on Jan. 6, 2003.

(51) Int. Cl.
*G06F 11/00* (2006.01)
(52) U.S. Cl. .................. 714/12; 709/248; 713/375
(58) Field of Classification Search ................ 714/12; 713/375; 709/248
See application file for complete search history.

(56) References Cited

U.S. PATENT DOCUMENTS

| 3,772,505 A | 11/1973 | Massell |
| 3,938,007 A | 2/1976 | Boniger et al. |
| 3,956,671 A | 5/1976 | Nimmersjo |
| 3,963,964 A | 6/1976 | Mustaphi |
| 4,001,742 A | 1/1977 | Jencks et al. |
| 4,245,318 A | 1/1981 | Eckart et al. |
| 4,291,299 A | 9/1981 | Hinz et al. |
| 4,301,433 A | 11/1981 | Castonguay et al. |
| 4,311,919 A | 1/1982 | Nail |
| 4,415,968 A | 11/1983 | Maeda et al. |
| 4,423,459 A | 12/1983 | Stich et al. |

(Continued)

FOREIGN PATENT DOCUMENTS

EP 0718948 A2 6/1996

(Continued)

OTHER PUBLICATIONS

Atanackovic D. et al. An Integrated Knowledge-Based Model For Power-System Planning IEEE Expert, IEEE Inc. New York, Jul. 1997; pp. 65-71.

*Primary Examiner*—Robert Beausoliel
*Assistant Examiner*—Michael Maskulinski
(74) *Attorney, Agent, or Firm*—Ohlandt, Greeley, Ruggiero & Perle, L.L.P.

(57) ABSTRACT

A method for synchronizing a plurality of processors within a computer system is provided. The computer system includes a plurality of processors that are each communicatively coupled to a respective network wherein each network is independent of each other network. The method includes receiving a plurality of input signals at a first rate from at least one source, transmitting the input signals to a reference object, and transforming the input signal to a known temporal reference. The apparatus is configured to receive a plurality of input signals at a first rate from at least one source, transmit the input signals to a reference object, and transform the input signal to a known temporal reference.

61 Claims, 8 Drawing Sheets

U.S. PATENT DOCUMENTS

| | | |
|---|---|---|
| 4,432,031 A | 2/1984 | Premerlani |
| 4,455,612 A | 6/1984 | Girgis et al. |
| 4,468,714 A | 8/1984 | Russell |
| 4,503,490 A * | 3/1985 | Thompson .................. 713/375 |
| 4,589,074 A | 5/1986 | Thomas et al. |
| 4,623,949 A | 11/1986 | Salowe et al. |
| 4,631,625 A | 12/1986 | Alexander et al. |
| 4,642,724 A | 2/1987 | Ruta |
| 4,652,966 A | 3/1987 | Farag et al. |
| 4,672,501 A | 6/1987 | Bilac et al. |
| 4,672,555 A | 6/1987 | Hart et al. |
| 4,674,062 A | 6/1987 | Premerlani |
| 4,689,712 A | 8/1987 | Demeyer |
| 4,709,339 A | 11/1987 | Fernandes |
| 4,751,653 A | 6/1988 | Junk et al. |
| 4,752,853 A | 6/1988 | Matsko et al. |
| 4,754,407 A | 6/1988 | Nolan |
| 4,777,607 A | 10/1988 | Maury et al. |
| 4,783,748 A | 11/1988 | Swarztrauber et al. |
| 4,796,027 A | 1/1989 | Smith-Vaniz |
| 4,833,592 A | 5/1989 | Yamanaka |
| 4,849,848 A | 7/1989 | Ishii |
| 4,855,671 A | 8/1989 | Fernandes |
| 4,862,308 A | 8/1989 | Udren |
| 4,964,058 A | 10/1990 | Brown, Jr. |
| 4,979,122 A | 12/1990 | Davis et al. |
| 4,983,955 A | 1/1991 | Ham, Jr. et al. |
| 4,996,646 A | 2/1991 | Farrington |
| 5,053,735 A | 10/1991 | Ohishi et al. |
| 5,060,166 A | 10/1991 | Engel et al. |
| 5,101,191 A | 3/1992 | MacFadyen et al. |
| 5,134,691 A | 7/1992 | Elms |
| 5,136,458 A | 8/1992 | Durivage, III |
| 5,162,664 A | 11/1992 | Haun et al. |
| 5,166,887 A | 11/1992 | Farrington et al. |
| 5,170,310 A | 12/1992 | Studtmann et al. |
| 5,170,360 A | 12/1992 | Porter et al. |
| 5,179,376 A | 1/1993 | Pomatto |
| 5,182,547 A | 1/1993 | Griffith |
| 5,185,705 A | 2/1993 | Farrington |
| 5,196,831 A | 3/1993 | Bscheider |
| 5,214,560 A | 5/1993 | Jensen |
| 5,216,621 A | 6/1993 | Dickens |
| 5,225,994 A | 7/1993 | Arinobu et al. |
| 5,231,565 A | 7/1993 | Bilas et al. |
| 5,237,511 A | 8/1993 | Caird et al. |
| 5,247,454 A | 9/1993 | Farrington et al. |
| 5,253,159 A | 10/1993 | Bilas et al. |
| 5,272,438 A | 12/1993 | Stumme |
| 5,301,121 A | 4/1994 | Garverick et al. |
| 5,305,174 A | 4/1994 | Morita et al. |
| 5,311,392 A | 5/1994 | Kinney et al. |
| 5,323,307 A | 6/1994 | Wolf et al. |
| 5,353,188 A | 10/1994 | Hatakeyama |
| 5,361,184 A | 11/1994 | El-Sharkawi et al. |
| 5,367,427 A | 11/1994 | Matsko et al. |
| 5,369,356 A | 11/1994 | Kinney et al. |
| 5,381,554 A | 1/1995 | Langer et al. |
| 5,384,712 A | 1/1995 | Oravetz et al. |
| 5,402,299 A | 3/1995 | Bellei |
| 5,406,495 A | 4/1995 | Hill |
| 5,414,635 A | 5/1995 | Ohta |
| 5,420,799 A | 5/1995 | Peterson et al. |
| 5,422,778 A | 6/1995 | Good et al. |
| 5,440,441 A | 8/1995 | Ahuja |
| 5,451,879 A | 9/1995 | Moore |
| 5,487,016 A | 1/1996 | Elms |
| 5,490,086 A | 2/1996 | Leone et al. |
| 5,493,468 A | 2/1996 | Hunter et al. |
| 5,530,738 A | 6/1996 | McEachern |
| 5,534,782 A | 7/1996 | Nourse |
| 5,534,833 A | 7/1996 | Castonguay et al. |
| 5,537,327 A | 7/1996 | Snow et al. |
| 5,544,065 A | 8/1996 | Engel et al. |
| 5,559,719 A | 9/1996 | Johnson et al. |
| 5,560,022 A | 9/1996 | Dunstan et al. |
| 5,576,625 A | 11/1996 | Sukegawa et al. |
| 5,581,471 A | 12/1996 | McEachern et al. |
| 5,587,917 A | 12/1996 | Elms |
| 5,596,473 A | 1/1997 | Johnson et al. |
| 5,600,527 A | 2/1997 | Engel et al. |
| 5,608,646 A | 3/1997 | Pomatto |
| 5,613,798 A | 3/1997 | Braverman |
| 5,619,392 A | 4/1997 | Bertsch et al. |
| 5,627,716 A | 5/1997 | Lagree et al. |
| 5,627,717 A | 5/1997 | Pein et al. |
| 5,627,718 A | 5/1997 | Engel et al. |
| 5,629,825 A | 5/1997 | Wallis et al. |
| 5,631,798 A | 5/1997 | Seymour et al. |
| 5,638,296 A | 6/1997 | Johnson et al. |
| 5,650,936 A | 7/1997 | Loucks et al. |
| 5,661,658 A | 8/1997 | Putt et al. |
| 5,666,256 A | 9/1997 | Zavis et al. |
| 5,670,923 A | 9/1997 | Gonzalez et al. |
| 5,694,329 A | 12/1997 | Pomatto |
| 5,696,695 A | 12/1997 | Ehlers et al. |
| 5,719,738 A | 2/1998 | Singer et al. |
| 5,734,576 A | 3/1998 | Klancher |
| 5,736,847 A | 4/1998 | Van Doorn et al. |
| 5,737,231 A | 4/1998 | Pyle et al. |
| 5,742,513 A | 4/1998 | Bouhenguel et al. |
| 5,751,524 A | 5/1998 | Swindler |
| 5,754,033 A | 5/1998 | Thomson |
| 5,754,440 A | 5/1998 | Cox et al. |
| 5,768,148 A | 6/1998 | Murphy et al. |
| 5,784,237 A | 7/1998 | Velez |
| 5,784,243 A | 7/1998 | Pollman et al. |
| 5,786,699 A | 7/1998 | Sukegawa et al. |
| 5,812,389 A | 9/1998 | Katayama et al. |
| 5,821,704 A | 10/1998 | Carson et al. |
| 5,825,643 A | 10/1998 | Dvorak et al. |
| 5,828,576 A | 10/1998 | Loucks et al. |
| 5,828,983 A | 10/1998 | Lombardi |
| 5,831,428 A | 11/1998 | Pyle et al. |
| 5,867,385 A | 2/1999 | Brown et al. |
| 5,872,722 A | 2/1999 | Oravetz et al. |
| 5,872,785 A | 2/1999 | Kienberger |
| 5,890,097 A | 3/1999 | Cox |
| 5,892,449 A | 4/1999 | Reid et al. |
| 5,903,426 A | 5/1999 | Ehling |
| 5,905,616 A | 5/1999 | Lyke |
| 5,906,271 A | 5/1999 | Castonguay et al. |
| 5,907,685 A * | 5/1999 | Douceur ..................... 709/248 |
| 5,926,089 A | 7/1999 | Sekiguchi et al. |
| 5,936,817 A | 8/1999 | Matsko et al. |
| 5,946,210 A | 8/1999 | Montminy et al. |
| 5,958,060 A * | 9/1999 | Premerlani .................. 713/400 |
| 5,963,457 A | 10/1999 | Kanoi et al. |
| 5,973,481 A | 10/1999 | Thompson et al. |
| 5,973,899 A | 10/1999 | Williams et al. |
| 5,982,595 A | 11/1999 | Pozzuoli |
| 5,982,596 A | 11/1999 | Spencer et al. |
| 5,995,911 A | 11/1999 | Hart |
| 6,005,757 A | 12/1999 | Shvach et al. |
| 6,005,758 A | 12/1999 | Spencer et al. |
| 6,018,451 A | 1/2000 | Lyke et al. |
| 6,038,516 A | 3/2000 | Alexander et al. |
| 6,047,321 A | 4/2000 | Raab et al. |
| 6,052,712 A * | 4/2000 | Badovinatz et al. ........ 709/205 |
| 6,054,661 A | 4/2000 | Castonguay et al. |
| 6,055,145 A | 4/2000 | Lagree et al. |
| 6,061,609 A | 5/2000 | Kanoi et al. |
| 6,084,758 A | 7/2000 | Clarey et al. |
| 6,138,241 A | 10/2000 | Eckel et al. |

| | | | | | | |
|---|---|---|---|---|---|---|
| 6,139,327 | A | 10/2000 | Callahan et al. | 6,535,797 B1 | 3/2003 | Bowles et al. |
| 6,141,196 | A | 10/2000 | Premerlani et al. | 6,549,880 B1 | 4/2003 | Willoughby et al. |
| 6,157,527 | A | 12/2000 | Spencer et al. | 6,553,418 B1 | 4/2003 | Collins et al. |
| 6,167,329 | A | 12/2000 | Engel et al. | 6,587,957 B1 * | 7/2003 | Arsenault et al. ............ 713/500 |
| 6,175,780 | B1 | 1/2001 | Engel | 6,687,756 B1 * | 2/2004 | Rawson, III ................. 709/248 |
| 6,185,482 | B1 | 2/2001 | Egolf et al. | 2001/0010032 A1 | 7/2001 | Ehlers et al. |
| 6,185,508 | B1 | 2/2001 | Van Doorn et al. | 2001/0032025 A1 | 10/2001 | Lenz et al. |
| 6,186,842 | B1 | 2/2001 | Hirschbold et al. | 2001/0044588 A1 | 11/2001 | Mault |
| 6,195,243 | B1 | 2/2001 | Spencer et al. | 2001/0048354 A1 | 12/2001 | Douville et al. |
| 6,198,402 | B1 | 3/2001 | Hasegawa et al. | 2001/0055965 A1 | 12/2001 | Delp et al. |
| 6,199,169 | B1 * | 3/2001 | Voth ........................... 713/400 | 2002/0010518 A1 | 1/2002 | Reid et al. |
| 6,212,049 | B1 | 4/2001 | Spencer et al. | 2002/0032535 A1 | 3/2002 | Alexander et al. |
| 6,233,128 | B1 | 5/2001 | Spencer et al. | 2002/0034086 A1 | 3/2002 | Scoggins et al. |
| 6,236,949 | B1 | 5/2001 | Hart | 2002/0045992 A1 | 4/2002 | Shincovich et al. |
| 6,242,703 | B1 | 6/2001 | Castonguay et al. | 2002/0059401 A1 | 5/2002 | Austin |
| 6,268,991 | B1 | 7/2001 | Criniti et al. | 2002/0063635 A1 | 5/2002 | Shincovich |
| 6,285,917 | B1 | 9/2001 | Sekiguchi et al. | 2002/0064010 A1 | 5/2002 | Nelson et al. |
| 6,288,882 | B1 | 9/2001 | Criniti et al. | 2002/0091949 A1 | 7/2002 | Ykema |
| 6,289,267 | B1 | 9/2001 | Alexander et al. | 2002/0094799 A1 | 7/2002 | Elliott et al. |
| 6,291,911 | B1 | 9/2001 | Dunk et al. | 2002/0107615 A1 | 8/2002 | Bjorklund |
| 6,292,340 | B1 | 9/2001 | O'Regan et al. | 2002/0108065 A1 | 8/2002 | Mares |
| 6,292,717 | B1 | 9/2001 | Alexander et al. | 2002/0109722 A1 | 8/2002 | Rogers et al. |
| 6,292,901 | B1 | 9/2001 | Lys et al. | 2002/0111980 A1 | 8/2002 | Miller et al. |
| 6,297,939 | B1 | 10/2001 | Bilac et al. | 2002/0116092 A1 | 8/2002 | Hamamatsu et al. |
| 6,313,975 | B1 | 11/2001 | Dunne et al. | 2002/0124011 A1 | 9/2002 | Baxter et al. |
| 6,339,796 | B1 * | 1/2002 | Gambino .................... 709/248 | 2002/0143998 A1 * | 10/2002 | Rajagopal et al. .......... 709/248 |
| 6,341,054 | B1 | 1/2002 | Walder et al. | 2002/0146076 A1 | 10/2002 | Lee |
| 6,347,027 | B1 | 2/2002 | Nelson et al. | 2002/0146083 A1 | 10/2002 | Lee et al. |
| 6,351,823 | B1 | 2/2002 | Mayer et al. | 2002/0147503 A1 | 10/2002 | Osburn, III |
| 6,356,422 | B1 | 3/2002 | Bilac et al. | 2002/0159402 A1 | 10/2002 | Binder |
| 6,356,849 | B1 | 3/2002 | Jaffe | 2002/0162014 A1 | 10/2002 | Przydatek et al. |
| 6,369,996 | B1 | 4/2002 | Bo | 2002/0163918 A1 | 11/2002 | Cline |
| 6,377,051 | B1 | 4/2002 | Tyner et al. | 2002/0165677 A1 | 11/2002 | Lightbody et al. |
| 6,385,022 | B1 | 5/2002 | Kulidjian et al. | 2002/0181174 A1 | 12/2002 | Bilac et al. |
| 6,396,279 | B1 | 5/2002 | Gruenert | 2002/0193888 A1 | 12/2002 | Wewalaarachchi et al. |
| 6,397,155 | B1 | 5/2002 | Przydatek et al. | 2003/0043785 A1 | 3/2003 | Liu et al. |
| 6,405,104 | B1 | 6/2002 | Dougherty | | | |
| 6,406,328 | B1 | 6/2002 | Attarian et al. | | | |
| 6,411,865 | B1 | 6/2002 | Qin et al. | EP | 0723325 A1 | 7/1996 |
| 6,441,931 | B1 | 8/2002 | Moskovich et al. | EP | 0949734 A2 | 10/1999 |
| 6,459,997 | B1 | 10/2002 | Anderson | | | |
| 6,496,342 | B1 | 12/2002 | Horvath et al. | * cited by examiner | | |

FOREIGN PATENT DOCUMENTS

METHOD AND SYSTEM FOR EXTERNAL CLOCK TO OBTAIN MULTIPLE SYNCHRONIZED REDUNDANT COMPUTERS

CROSS REFERENCE TO RELATED APPLICATIONS

This application is related to U.S. Patent Application No. 60/359,544 filed on Feb. 25, 2002 for "Integrated Protection, Monitoring, and Control" the content of which is incorporated in its entirety herein by reference. This application is also related to U.S. Patent Application No. 60/438,159 filed on Jan. 6, 2003 for "Single Processor Concept for Protection and Control of Circuit Breakers in Low-Voltage Switchgear" the content of which is incorporated in its entirety herein by reference.

BACKGROUND OF THE INVENTION

This invention relates generally to electrical switchgear and more particularly, to a method and apparatus for protecting, monitoring, and controlling the electrical switchgear.

In an industrial power distribution system, power generated by a power generation company may be supplied to an industrial or commercial facility wherein the power is distributed around the industrial or commercial facility to various equipment such as, for example, motors, welding machinery, computers, heaters, lighting, and other electrical equipment. At least some known power distribution systems include switchgear which facilitates dividing the power into branch circuits which supply power to various portions of the industrial facility. Circuit breakers are provided in each branch circuit to facilitate protecting equipment within the branch circuit. Additionally, circuit breakers in each branch circuit can facilitate minimizing equipment failures since specific loads may be energized or de-energized without affecting other loads, thus creating increased efficiencies, and reduced operating and manufacturing costs. Similar switchgear may also be used within an electric utility transmission system and a plurality of distribution substations, although the switching operations used may be more complex.

Switchgear typically includes multiple devices other than the power distribution system components to provide protection, monitoring, and control of the power distribution system components. For example, at least some known power distribution systems include a monitor device to monitor a performance of the power distribution system, a control device to control an operation of the power distribution system, and a protection device to initiate a protective response when the protection device is activated.

BRIEF DESCRIPTION OF THE INVENTION

In one aspect, a method for synchronizing a plurality of processors within a computer system is provided. The computer system includes a plurality of processors that are each communicatively coupled to a respective network wherein each network is independent of each other network. The method includes receiving a plurality of input signals at a first rate from at least one source, transmitting the input signals to a reference object, and transforming the input signal to a known temporal reference. The apparatus is configured to receive a plurality of input signals at a first rate from at least one source, transmit the input signals to a reference object, and transform the input signal to a known temporal reference.

In another aspect, an apparatus synchronizing a plurality of processors within a computer system is provided. The computer system includes a plurality of processors that are each communicatively coupled to a respective network wherein each network is independent of each other network. The apparatus is configured to receive a plurality of input signals at a first rate from at least one source, transmit the input signals to a reference object, and transform the input signal to a known temporal reference.

DETAILED DESCRIPTION OF THE INVENTION

The methods and apparatus described herein, referred to as system data capture describe an apparatus for a conditional logging, display or processing of data collected by a data capture system. In one embodiment, the method operates in a real-time data capture mode. In another embodiment, the method is also applicable to non-real-time systems. System data capture, when used with a circuit breaker control and protection system, allows system data to be analyzed off-line. Additionally, system data capture facilitates analysis of data collected from an entire system, e.g. current and voltage measurements, and breaker state, to facilitate identifying a plurality of fault types, and distinguishing between a legitimate fault and a nuisance trip as known by one skilled in the art.

Figure 1:
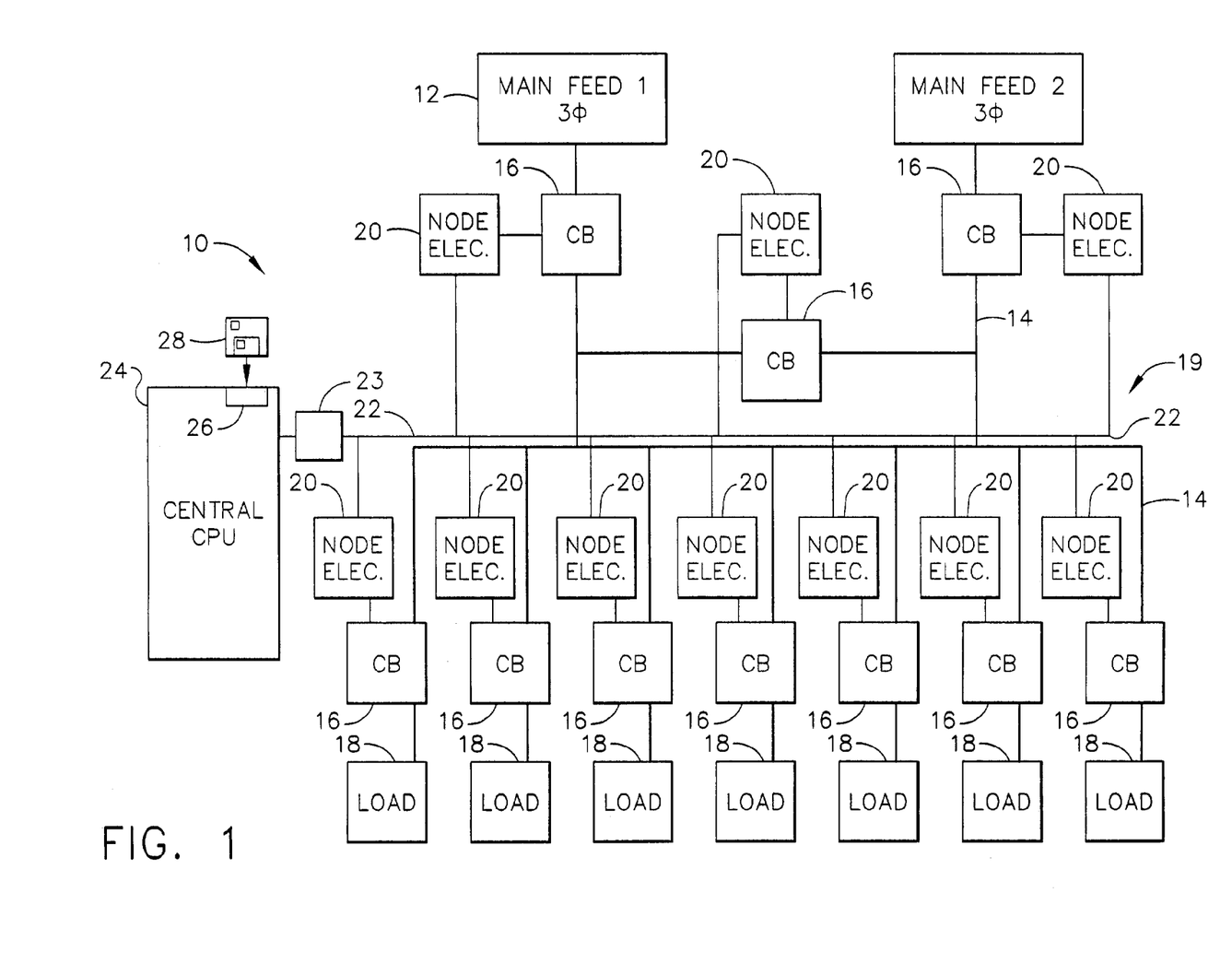
FIG. 1 illustrates an exemplary schematic illustration of a power distribution system that may be used by an industrial or commercial facility for example.

FIG. 1 illustrates an exemplary schematic illustration of a power distribution system 10, used by an industrial facility for example. In an exemplary embodiment, system 10 includes at least one main feed system 12, a power distribution bus 14, a plurality of power circuit switches or interrupters, also referred to herein as a circuit breakers (CB) 16, and at least one load 18, such as, but not limited to, motors, welding machinery, computers, heaters, lighting, and/or other electrical equipment.

In use, power is supplied to a main feed system 12, i.e. a switchboard for example, from a source (not shown) such as, but not limited to, a steam turbine, powered from, for example, a nuclear reactor or a coal fired boiler, a gas turbine generator, and a diesel generator. Power supplied to main feed system 12 is divided into a plurality of branch circuits using circuit breakers 16 which supply power to various loads 18 in the industrial facility. In addition, circuit breakers 16 are provided in each branch circuit to facilitate protecting equipment, i.e. loads 18, connected within the respective branch circuit. Additionally, circuit breakers 16 facilitate minimizing equipment failures since specific loads 18 may be energized or de-energized without affecting other loads 18, thus creating increased efficiencies; and reduced operating and manufacturing costs.

Power distribution system 10 includes a circuit breaker control protection system 19 that includes a plurality of node electronics units 20 that are each electrically coupled to a digital network 22. Circuit breaker control protection system 19 also includes at least one central control processing unit (CCPU) 24 that is electrically coupled to digital network 22 via a switch 23 such as, but not limited to, an Ethernet switch 23. In use, each respective node electronics unit 20 is electrically coupled to a respective circuit breaker 16, such that CCPU 24 is electrically coupled to each circuit breaker 16 through digital network 22 and through an associated node electronics unit 20.

In the exemplary embodiment, digital network 22 is a Fast Ethernet protocol network. In another embodiment, digital network 22 includes, for example, at least one of a local area network (LAN) or a wide area network (WAN), dial-in-connections, cable modems, and special high-speed ISDN lines. Digital network 22 also includes any device capable of interconnecting to the Internet including a web-based phone, personal digital assistant (PDA), or other web-based connectable equipment. It should be appreciated that the digital network 22 network is upgradeable based on future revisions to IEEE 802.3(u) and its successors. It should further be appreciated that the digital network 22 is configurable, for example, in a star topology.

In one embodiment, CCPU 24 is a computer and includes a device 26, for example, a floppy disk drive or CD-ROM drive, to facilitate reading instructions and/or data from a computer-readable medium 28, such as a floppy disk or CD-ROM. In another embodiment, CCPU 24 executes instructions stored in firmware (not shown). CCPU 24 is programmed to perform functions described herein, but other programmable circuits can likewise be programmed. Accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits. Additionally, although described in a power distribution setting, it is contemplated that the benefits of the invention accrue to all electrical distribution systems including industrial systems such as, for example, but not limited to, an electrical distribution system installed in an office building.

Figure 2:
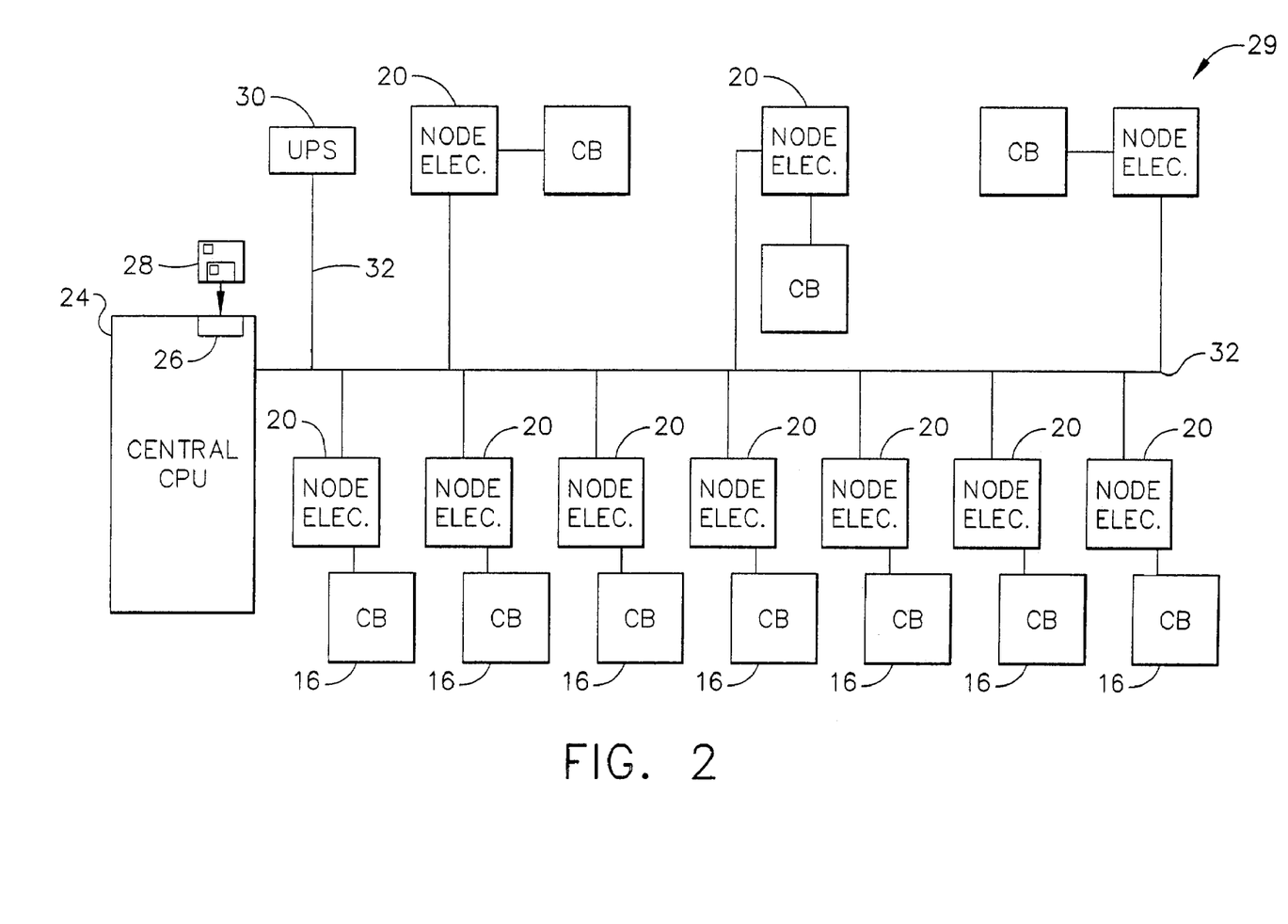
FIG. 2 is an exemplary schematic illustration of a node power distribution system that can be used with the power distribution system shown in FIG. 1.

FIG. 2 is an exemplary schematic illustration of a node power distribution system 29 that can be used with power distribution system 10 (shown in FIG. 1) and more specifically, with circuit breaker control protection system 19 (shown in FIG. 1). Node power distribution system 29 includes a power source 30 that is electrically coupled to node electronics units 20 through a node power distribution bus 32. In an exemplary embodiment, power source 30 is an uninterruptible power supply (UPS). In one embodiment, power source 30 receives power from power distribution system 10 and then distributes this power to node electronics units 20 through node power distribution bus 32. In an alternative embodiment, power is not supplied to power source 30, but rather, power source 30 supplies power to node electronics units 20 using an internal power supply, such as, but not limited to, a plurality of batteries (not shown). In another alternate embodiment, node electronic units 20 are powered by secondary current available from current sensor 82 and/or voltage sensor 84. In this embodiment, circuit breaker control protection system 19 would not include node power distribution system 29, power source 30, or node power distribution bus 32.

Figure 3:
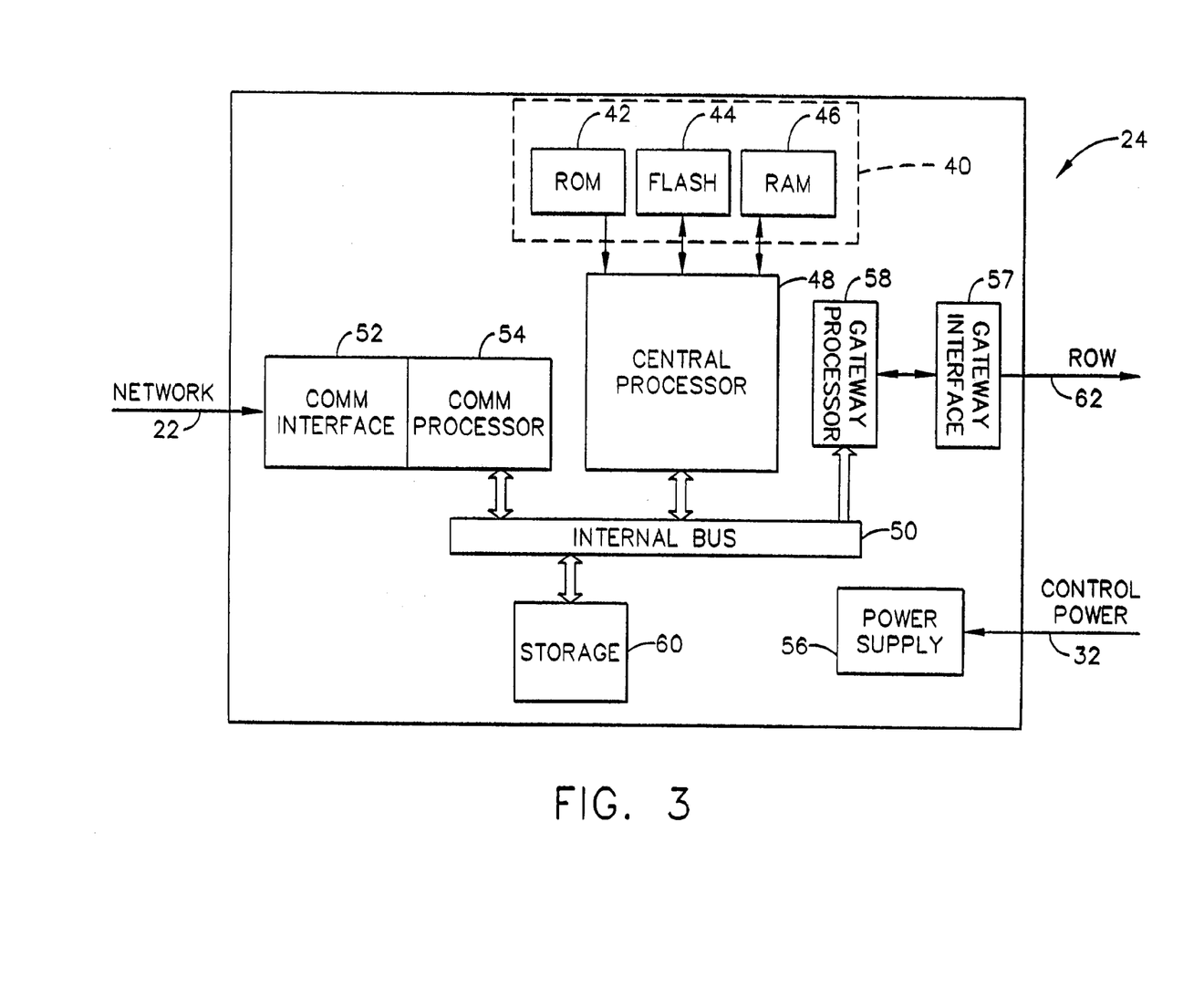
FIG. 3 is an exemplary schematic illustration of a CCPU that may be used with the power distribution system shown in FIG. 1.

FIG. 3 is an exemplary schematic illustration of CCPU 24. CCPU 24 includes at least one memory device 40, such as, but not limited to, a read only memory (ROM) 42, a flash memory 44, and/or a random access memory (RAM) 46. CCPU 24 also includes a central processor unit (CPU) 48 that is electrically coupled to at least one memory device 40, as well as an internal bus 50, a communications interface 52, and a communications processor 54. In an exemplary embodiment, CCPU 24 is a printed circuit board and includes a power supply 56 to supply power to a plurality of devices on the printed circuit board.

Additionally, in an exemplary embodiment, internal bus 50 includes an address bus, a data bus, and a control bus. In use, the address bus is configured to enable CPU 48 to address a plurality of internal memory locations or an input/output port, such as, but not limited to communications interface 52 through communications processor 54, and a gateway interface 57, through a gateway processor 58. The data bus is configured to transmit instructions and/or data between CPU 48 and at least one input/output, and the control bus is configured to transmit signals between the plurality of devices to facilitate ensuring that the devices are operating in synchronization. In the exemplary embodiment, internal bus 50 is a bi-directional bus such that signals can be transmitted in either direction on internal bus 50. CCPU 24 also includes at least one storage device 60 configured to store a plurality of information transmitted via internal bus 50.

In use, gateway interface 57 communicates to a remote workstation (not shown) via an Internet link 62 or an Intranet 62. In the exemplary embodiment, the remote workstation is a personal computer including a web browser. Although a single workstation is described, such functions as described herein can be performed at one of many personal computers coupled to gateway interface 57. For example, gateway interface 57 may be communicatively coupled to various individuals, including local operators and to third parties, e.g., remote system operators via an ISP Internet connection. The communication in the example embodiment is illustrated as being performed via the Internet, however, any other wide area network (WAN) type communication can be utilized in other embodiments, i.e., the systems and processes are not limited to being practiced via the Internet. In one embodiment, information is received at gateway interface 57 and transmitted to node electronics unit 20 via CCPU 24 and digital network 22. In another embodiment, information sent from node electronics unit 20 is received at communication interface 52 and transmitted to Internet 62 via gateway interface 57.

Figure 4:
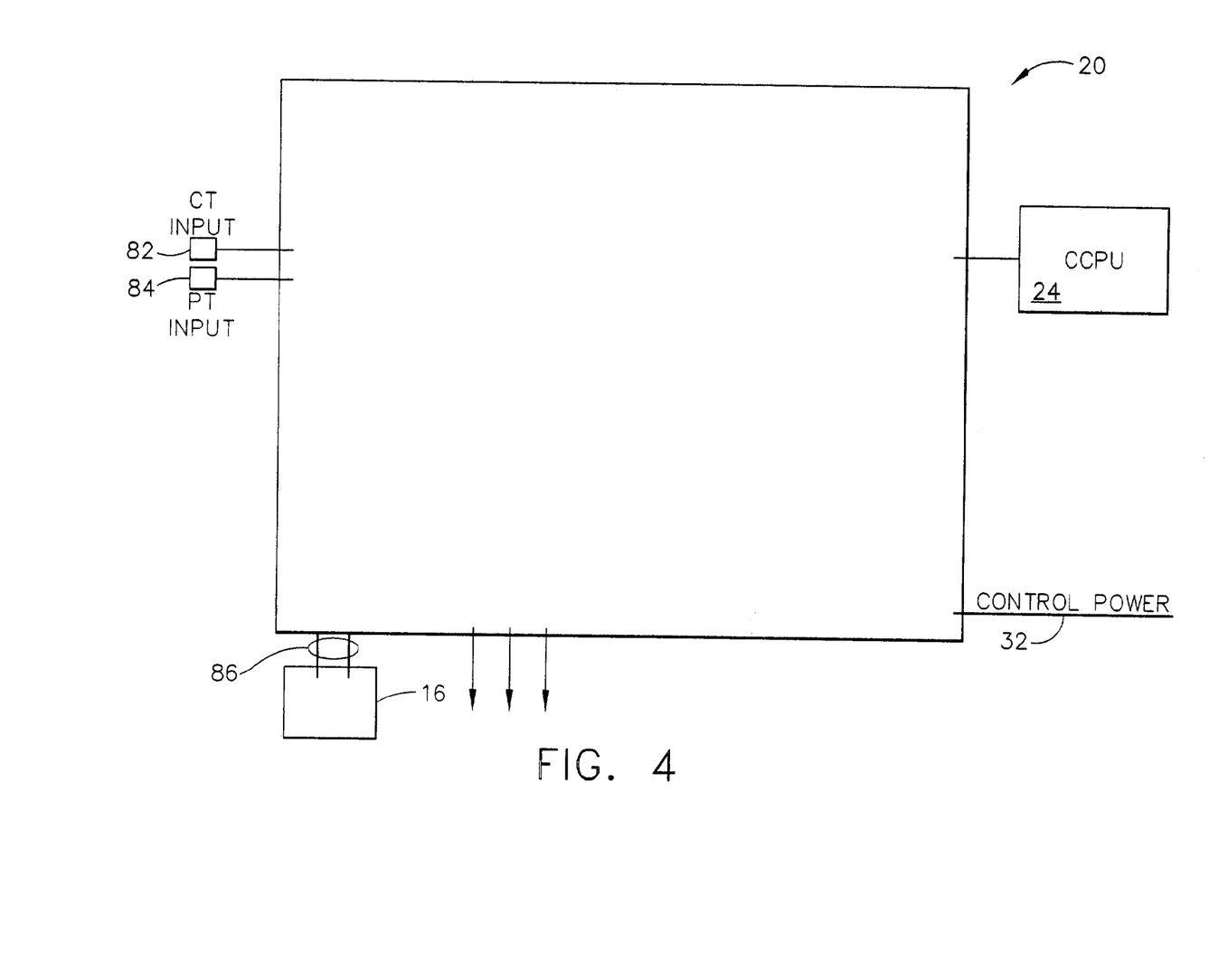
FIG. 4 is an exemplary schematic illustration of a single node electronic unit that may be used with the power distribution system shown in FIG. 1.

FIG. 4 is an exemplary schematic illustration of single node electronic unit 20. In the exemplary embodiment, node electronic unit 20 is a unitary device mounted remotely from CCPU 24 and circuit breaker 16. In an exemplary embodiment, node electronic unit 20 is separate from, but proximate to circuit breaker 16. In an exemplary embodiment, node electronic unit 20 is a printed circuit board.

In one embodiment, node electronics unit 20 receives signals input from a plurality of devices, such as, but not limited to, a current sensor 82, a voltage sensor 84, and/or circuit breaker 16. Status signals from circuit breaker 16 can include signals related to one or more conditions of the breaker, such as, but not limited to, an auxiliary switch status, and a spring charge switch status. Additionally, node electronics unit 20 sends signals to at least circuit breaker 16 in order to control one or more states of the breaker.

In use, signals are transmitted to CCPU 24 via node electronics unit 20, and digital network 22. Node electronics unit 20 receives the signals and packages a digital message that includes the signals and additional data relating to a health and status of node electronics unit 20. The health and status data may include information based on problems found by internal diagnostic routines and a status of self checking routines that run locally in node electronics unit 20. CCPU 24 processes digital message using one or more protection algorithms, monitoring algorithms, and any combination thereof. In response to the processing of digital message, CCPU 24 sends digital message back to node electronics unit 20 via digital network 22. In the exemplary embodiment, node electronics unit 20 actuates circuit breaker 16 via signal in response to digital message received from CCPU 24. In one embodiment, circuit breaker 16 is actuated in response to commands sent only by CCPU 24, i.e., circuit breaker 16 is not controlled locally by node electronics unit 20, but rather is operated remotely from CCPU 24 based on digital message received from node electronics unit 20 over network 22.

Figure 5:
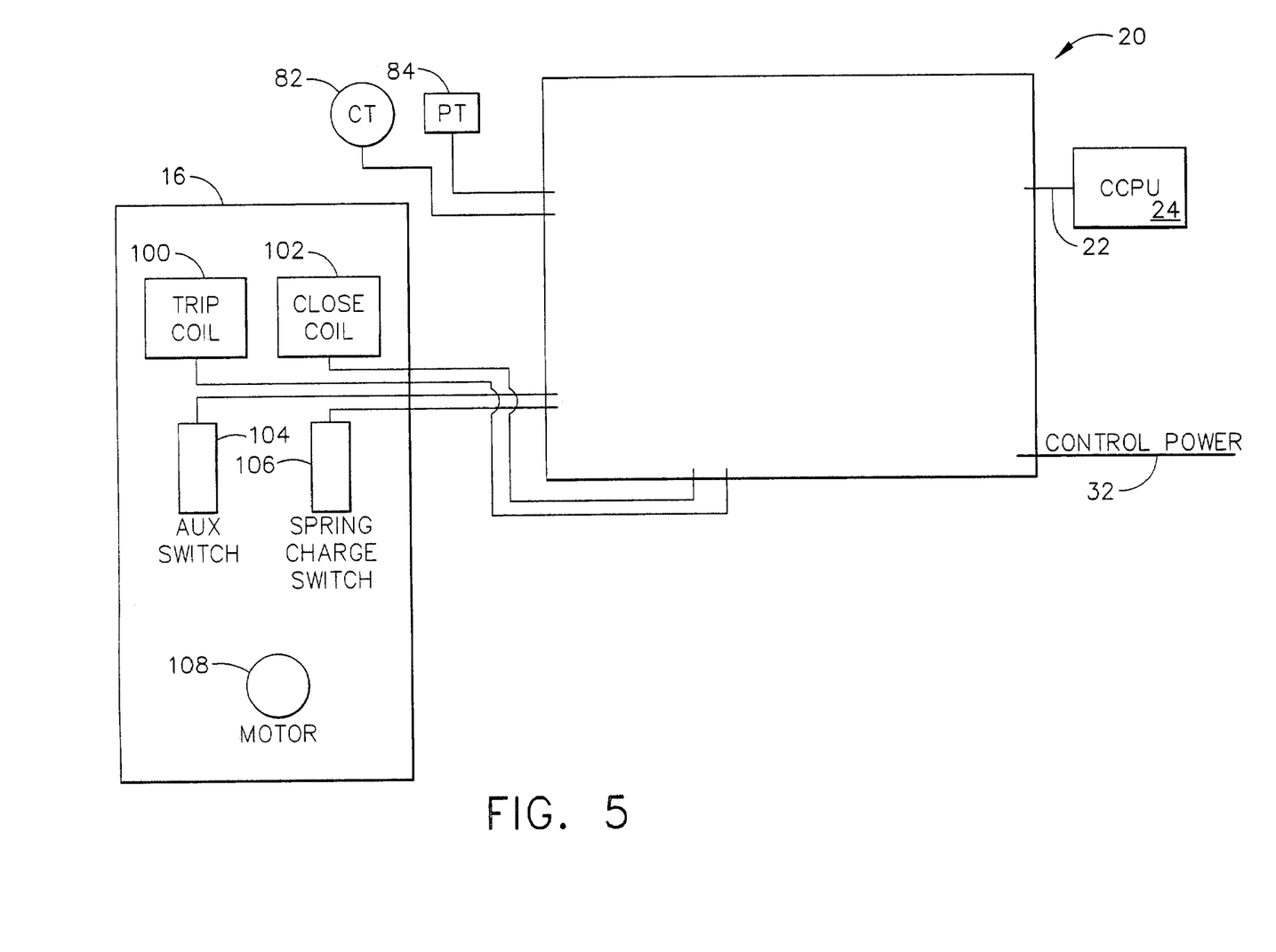
FIG. 5 is an exemplary schematic illustration of a circuit breaker that may be used with the power distribution system shown in FIG. 1.

FIG. 5 is an exemplary schematic illustration of circuit breaker 16 that is electrically coupled to node electronics unit 20. In the exemplary embodiment, circuit breaker 16 includes a switch assembly that includes movable and/or stationary contacts, an arc suppression means, and a tripping and operating mechanism. Circuit breaker 16 includes only a trip coil 100, a close coil 102, an auxiliary switch 104, a spring charge switch 106, and a motor 108. Circuit breaker 16 does not include a trip unit. The various components of breaker 16 (e.g., trip coil 100, close coil 102, auxiliary switch 104, spring charge switch 106, motor 108) can be powered by node electronics unit 20. Alternately, breaker 16 can be powered by secondary current available from current sensor 82 and/or voltage sensor 84.

Circuit breaker 16 is in electrical communication with node electronics unit 20 through a wiring harness, which may include copper wiring, communications conduits, and any combination thereof. Current sensor 82, and voltage sensor 84 are in electrical communication with node electronics unit 20 through a cable that may include copper wiring, communications conduits, and any combination thereof In an exemplary embodiment, circuit breaker 16 is a unitary device mounted proximate to node electronics unit 20, current sensor 82, and voltage sensor 84.

In use, actuation signals from node electronics unit 20 are transmitted to circuit breaker 16 to actuate a plurality of functions in circuit breaker 16, such as, but not limited to, operating a trip coil 100, operating a close coil 102, and affecting a circuit breaker lockout feature. An auxiliary switch 104 and operating spring charge switch 106 provide a status indication of circuit breaker parameters to node electronics unit 20. Motor 108 is configured to recharge an operating spring, configured as a close spring (not shown) after circuit breaker 16 closes. It should be appreciated that the motor 108 can include, for example, a spring charge switch, a solenoid or any other electromechanical device capable of recharging a trip spring. To close circuit breaker 16, a close coil 102 is energized by a close signal from actuation power module (not shown). Close coil 102 actuates a closing mechanism (not shown) that couples at least one movable electrical contact (not shown) to a corresponding fixed electrical contact (not shown). The closing mechanism of circuit breaker 16 latches in a closed position such that when close coil 102 is de-energized, circuit breaker 16 remains closed. When breaker 16 closes, an "a" contact of auxiliary switch 104 also closes and a "b" contact of auxiliary switch 104 opens. The position of the "a" and "b" contacts is sensed by node electronics unit 20. To open circuit breaker 16, node electronics unit 20 energizes trip coil (TC) 100. TC 100 acts directly on circuit breaker 16 to release the latching mechanism that holds circuit breaker 16 closed. When the latching mechanism is released, circuit breaker 16 will open, opening the "a" contact and closing the "b" contact of auxiliary switch 104. Trip coil 100 is then de-energized by node electronics unit 20. After breaker 16 opens, with the close spring recharged by motor 108, circuit breaker 16 is prepared for a next operating cycle. In the exemplary embodiment, each node electronics unit 20 is coupled to circuit breaker 16 in a one-to-one correspondence. For example, each node electronics unit 20 communicates directly with only one circuit breaker 16. In an alternative embodiment, node electronics unit 20 may communicate with a plurality of circuit breakers 16.

Figure 6:
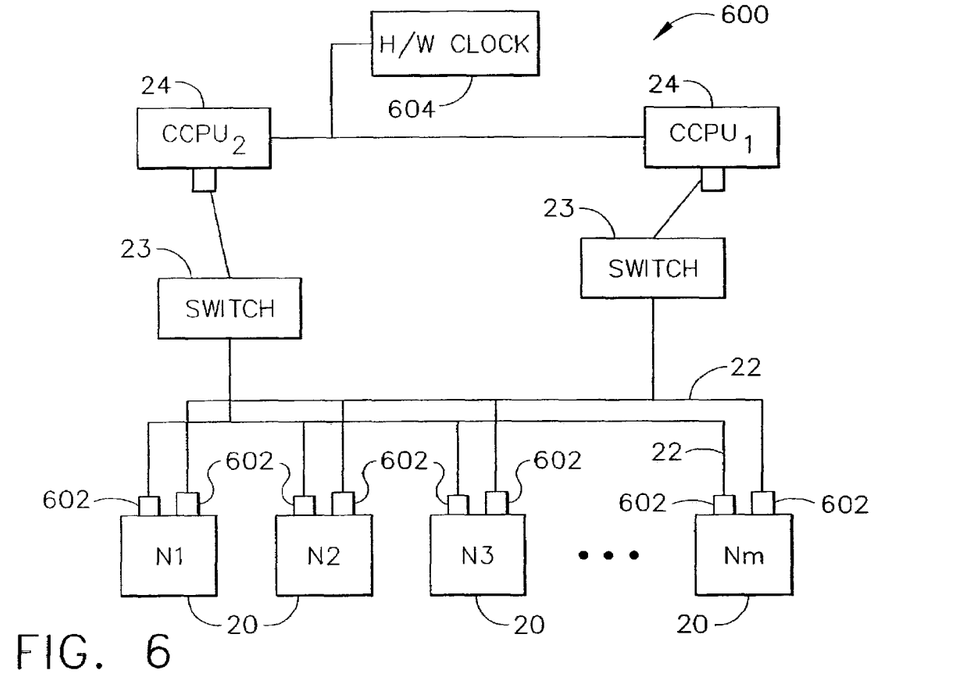
FIG. 6 is a simplified block diagram of a network portion of the power distribution system shown in FIG. 1.

FIG. 6 is a simplified block diagram of a network portion 600 of power distribution system 10 shown in FIG. 1. Components shown in FIG. 6 that are identical to components shown in FIG. 1 are numbered using the same reference numerals in FIG. 6 as were used in FIG. 1. Accordingly, network portion 600 of power distribution system 10 includes a plurality of node electronics units 20, each node electronics unit 20 is communicatively coupled to a doubly redundant network 22 through a communications interface 602 dedicated to each network 22. In the exemplary embodiment, network 22 is doubly redundant. In an alternative embodiment, network 22 may be redundant to a level predetermined by a user's requirements. Each network 22 is communicatively coupled to a network switch 23, which is communicatively coupled to a respective CCPU 24. Each CCPU 24 is communicatively coupled to a hardware clock 604. In the exemplary embodiment, a parallel port of each CCPU 24 is used to receive output signals from hardware clock 604. Hardware clock 604 may be redundant to a level predetermined by a user's requirements.

On operation, hardware clock 604 sends output signals that may include interrupt pulses at a regular interval to all CCPUs 24. Each interrupt pulse is assigned a sequence number. In the exemplary embodiment, the sequence number is 16 bits long. In another embodiment, the sequence number may be between 4 bits long and 64 bits long. Each interrupt pulse and sequence number are transmitted to each CCPU 24 parallel port such that each interrupt is continually identified by its respective sequence number. At each interrupt pulse, hardware clock 604 increments the sequence number such that a new sequential sequence number is sent with each successive interrupt pulse. When processor 48 receives the interrupt pulse, processor 48 services the interrupt according to its programmed instructions. In the exemplary embodiment, processor 48 transmits a transreference signal that includes a reference sequence number to all node electronics units 20 on network 22. To maintain a reference number, processor 48 increments an internal 64-bit register each time it receives the output signal from clock 604.

Additionally, processor 48 checks the incoming interrupt pulses for errors. Processor 48 estimates a time for the next interrupt pulse to be received. In the exemplary embodiment, a watchdog timer is used to estimate the expected time of the next input signal, or interrupt pulse. If the interrupt pulse is received within an expected window time, processor 48 uses the pulse to synchronize its own clock to the hardware clock 604 pulses. If the interrupt pulse is outside the expected time window, processor 48 determines if interrupt pulses were missed, meaning interrupt pulses were not received by processor 48. Intermittent or unreliable receipt of pulses may indicate a degradation of hardware clock 604 and/or interconnecting cabling and may cause CCPUs 24 and node electronics units 20 to lose synchronization. When interrupt pulses are missed, processor 48 attempts to restore the reference number by using its internal clock to estimate the number of interrupt pulses that were missed and incrementing the reference number by that number of estimated missed pulses. By this method reference number maintains a proper time increment relative to a starting point that may be coordinated to other timekeeping systems. In the exemplary embodiment, power distribution system 10 events may be coordinated with a utility company supply using the reference number. When processor 48 determines a failure of the interrupt pulses from hardware clock 406, an alternate source of stable pulses may be used. In the exemplary embodiment, processor 604 clock is used to supply interrupt pulses when hardware clock 604 fails. In an alternative embodiment, one of the CCPUs 24 connected to network 22 may be interconnected to each other processor 48 to supply an alternate source of stable pulses when hardware clock 604 fails.

Node electronics units 20 receive the transreference signal from CCPU 24 via network 22. Each node electronics unit 20 receives a transreference signal from each CCPU 24. In the exemplary embodiment, network 22 is doubly redundant and, as such, each node electronics unit 20 receives two transreference signals including an identifying sequence number. To properly synchronize the collection of data from the plurality of sensors associated with node electronics unit 20, node electronics unit 20 uses a corrector function procedure to synchronize its clock with the incoming transreference signals. In one embodiment, node electronics unit 20 error checks the incoming transreference signals for expected timing. If any of the CCPUs 24 connected to the network is sending transreference signals that fall outside the expected time window, that CCPU 24 will be flagged as being potentially faulty and the transreference signals from that CCPU 24 will be ignored. If all CCPUs are sending transreference signals that arrive within the expected time window, node electronics unit 20 determines a corrector procedure to synchronize the clock of node electronics unit 20 to the clock of CCPU 24. In the exemplary embodiment, node electronics unit 20 uses a predetermined preferred CCPU 24 to synchronize its clock to. As long as preferred CCPU 24 sends transreference signals within the expected time window, node electronics unit 20 will synchronize its clock to the preferred CCPU clock. If maser CCPU 24 clock sends transreference signals outside the expected time window, node electronics unit 20 may switch to synchronizing to a predetermined CCPU 24, based on an order of preference, until the preferred CCPU 24 returns to sending transreference signals within the expected time window. In an alternative embodiment, node electronics unit 20 averages the time it receives corresponding transreference signals from each CCPU 24 and synchronizes its clock to this average. Node electronics unit 20 uses the transreference signals in conjunction with a software phase lock loop to adjust the node electronics unit clock to be in synchronization with CCPU 24.

Figure 7:
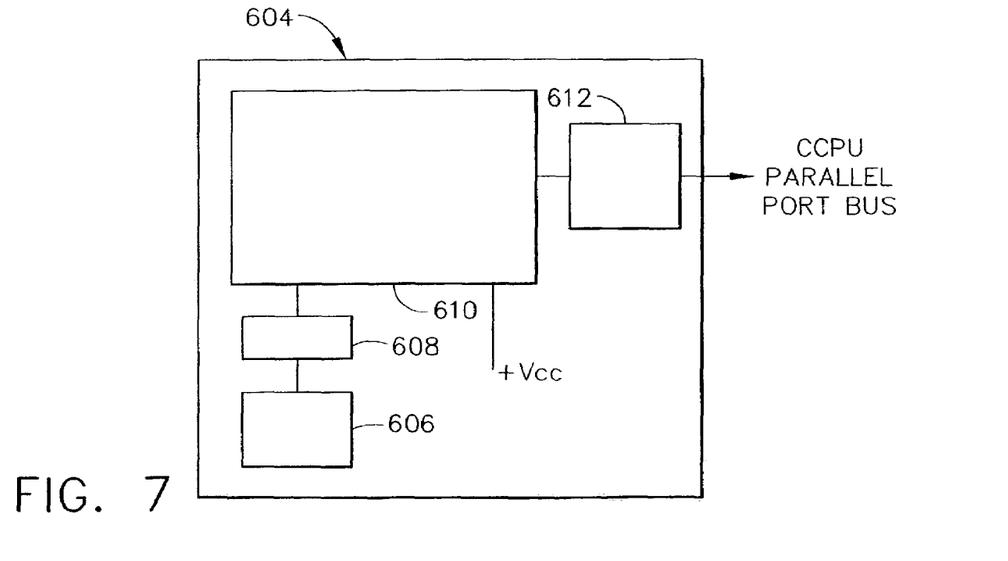
FIG. 7 is a schematic block diagram of an exemplary embodiment of the hardware clock that may be used in the network portion of the power distribution system that is shown in FIG. 6.

FIG. 7 is a schematic block diagram of an exemplary embodiment of hardware clock 604 that may be used in the network portion 600 of power distribution system 10 that is illustrated in FIG. 6. In the exemplary embodiment, hardware clock 604 includes a crystal oscillator 606 electrically coupled a divider circuit 608. An output of divider circuit 608 is coupled to an input of a field programmable gate array (FPGA) device 610. An output of FPGA 610 is coupled to a tristate buffer 612. The output of buffer 612 is coupled to a parallel port bus coupled to a parallel port of each of CCPU 24 coupled to power distribution system 10.

In use, FPGA 608 is used to divide clock pulses obtained from crystal oscillator 606 to a desired frequency for the interrupt signal. In the exemplary embodiment, crystal oscillator 606 operates at a frequency of approximately 1.832 MHz. Divider 608 divides the frequency of oscillator 606 down to approximately 4.0 kHz. FPGA 608 is also used to obtain an 8 or 16 bit sequence number. In the exemplary embodiment, the interrupt signal, a low/high byte signal, and the 2×8 bit sequence number (a 16 bit value given 1 byte at a time) are read by the parallel ports of all CCPUs 24.

Figure 8:
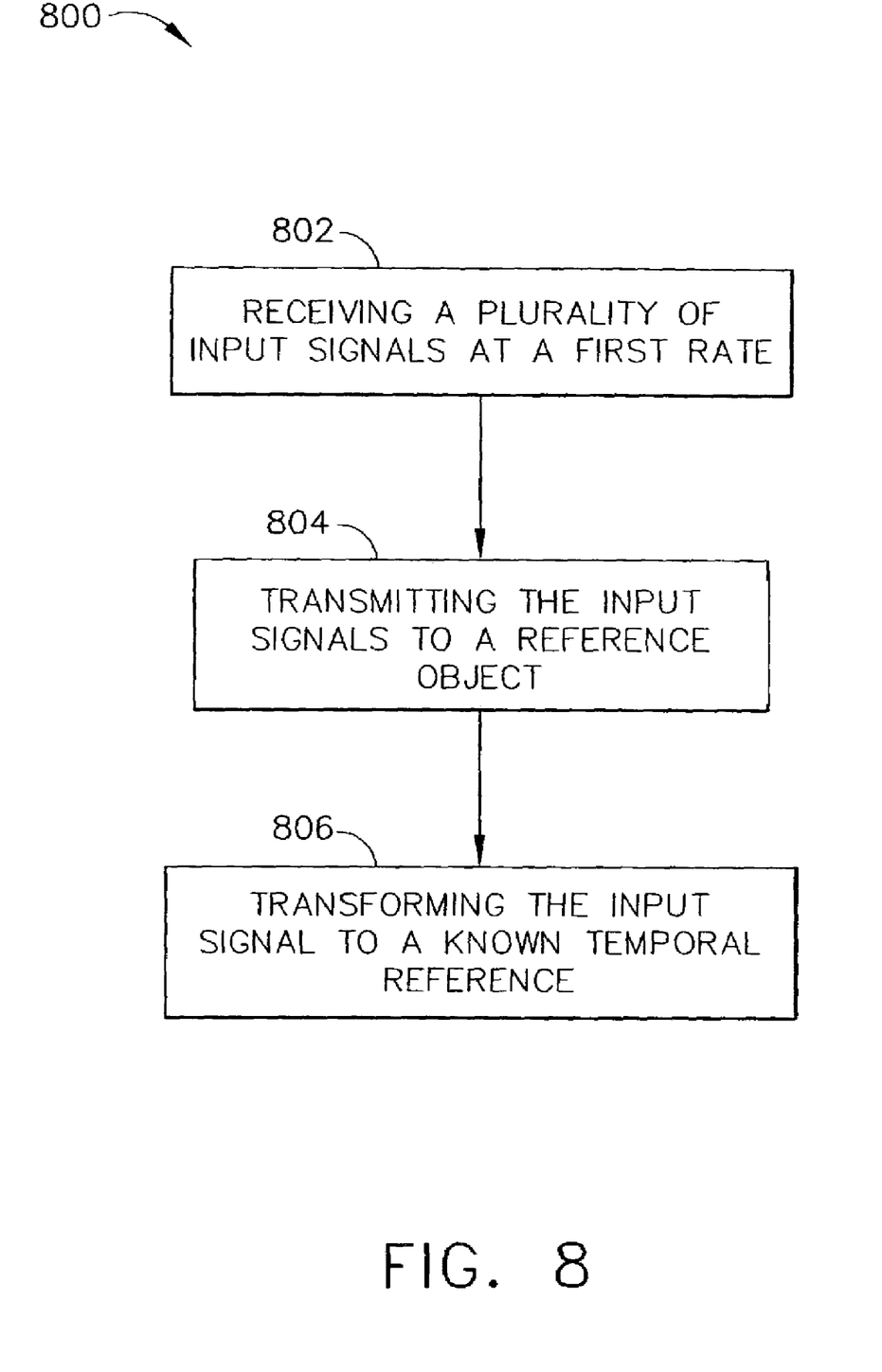
FIG. 8 is a flowchart illustrating an exemplary process for synchronizing multiple redundant computers shown in FIG. 6.

FIG. 8 is a flowchart 800 illustrating an exemplary process for synchronizing multiple redundant computers shown in FIG. 6. Each CCPU 24 operating on power distribution system 10 receives 802 a stream of interrupt pulses from hardware clock 604 through its respective parallel port. Although the interrupt pulses are described as being received by each CCPU 24 through their respective parallel port, each CCPU 24 could receive the interrupt pulses through any convenient port and/or a hardwire connection to hardware clock 604. CCPU 24 also receives 804 a sequence number associated with each pulse. The sequence number is generated by hardware clock 604. In the exemplary embodiment, the sequence number is a sixteen-bit number that is transmitted to all CCPUs 24 over an eight-bit bus in two bytes.

Each interrupt pulse causes each CCPU processor 48 to read the sequence number provided by hardware clock 604. The interrupt pulse is used by processor 48 for the executive clock that controls all internal computations. Upon receipt of each interrupt processor 48 transmits 804 the input signal including the sequence number to a reference object which increments an internal reference number counter that counts each interrupt pulse received and allows for reconstruction and coordination of data with external systems by transforming 806 the input signal to a known temporal reference. Processor 48 generates a multicast message that is broadcast via network 22 to all node electronics units 20. Each message includes a transreference signal and the sequence number associated with the pulse.

Each node electronics unit 20 operating on network 22 receives a multicast message from each CCPU 24 operating on network 22. Each node electronics unit 20 uses a predetermined procedure to arbitrate any differences between timing of messages. In one embodiment, node electronics unit 20 treats one of the CCPUs 24 as preferred and node electronics unit 20 uses the transreference signal and sequence number from that CCPU 24 until node electronics unit 20 determines that CCPU 24 is unreliable. In another embodiment, node electronics unit 20 may use an averaging technique or a voting technique to determine which CCPUs transreference signal is the most correct pulse to use.

Node electronics unit 20 synchronizes collecting data from its respective sensors using the transreference signal and the sequence number to sample sensors and internal electronic component registers such that the state of power distribution system 10 can be reconstructed accurately in CCPU 24. In a large power distribution system 10 each node electronics unit 20 may sample sensors and data registers at a different real-time due to time lags inherent in the system between node electronics units 20. Sampling many electrical parameters which are constantly changing with respect to time at even slightly different real-time would yield inaccurate results but, when each sampled parameter is associated with a transreference signal and sequence number, CCPU 24 can account for variations in the real-time when each sample was taken.

Node electronics unit 20 includes a software phase lock loop that uses the broadcast message and the transreference signal and sequence number to synchronize its clock to the CCPU clock.

Each CCPU 24 is programmed to perform error-checking of the incoming interrupt pulses. Each CCPU processor 48 determines an estimated time window for when to expect a next interrupt signal to arrive from hardware clock 604. If the next interrupt pulse is received within the expected window, processor 48 assumes hardware clock 604 and the interconnecting cabling is operating properly and takes no corrective action. If at least one interrupt pulse arrives outside the expected window, processor 48 executes an error handling routine that determines corrective action to maintain power distribution system 10 within synchronization. In the exemplary embodiment, processor 48 waits for four missed pulses before initiating the error-handling routine. In another embodiment, the period processor 48 waits is user configurable from zero missed pulses (processor uses an alternate source of pulses exclusively) to a maximum number, indicating processor 48 never uses an alternate source of pulses. In one embodiment, upon detecting that interrupt pulses have stopped arriving, switches to an alternate source of interrupt pulses, such as, for example, the processor clock, an alternate CCPU processor clock, or another alternate source of pulses. Processor 48 then estimates how many pulses were missed and increments the reference number register by that number to return the reference number register to as close to its proper time as possible. When the interrupt pulses are restored, processor 48 executes a procedure to restore synchronization to the hardware clock 604.

Figure 9:
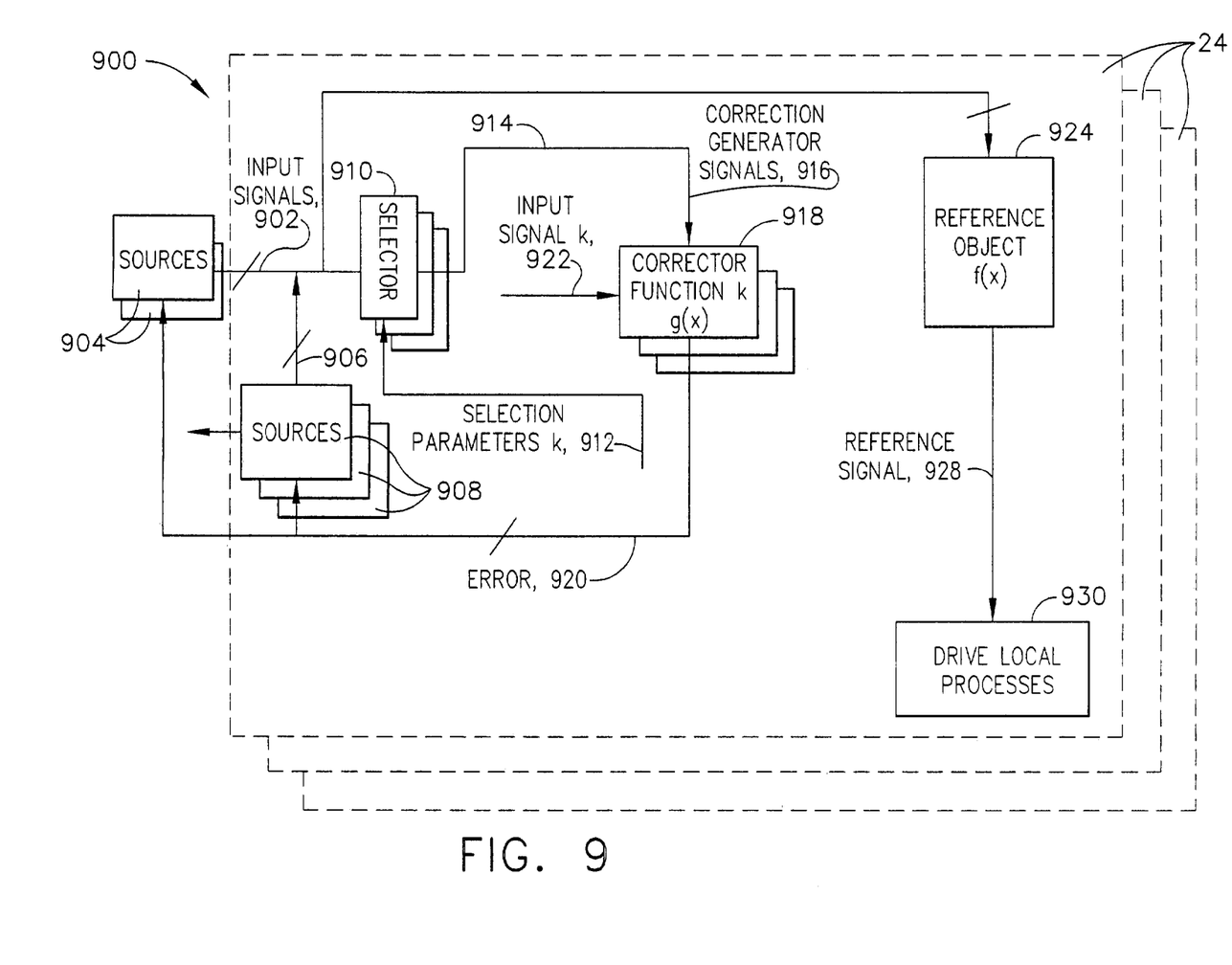
FIG. 9 is a data flow diagram illustrating an exemplary embodiment of a process for synchronizing multiple redundant computers shown in FIG. 6.

FIG. 9 is a data flow diagram illustrating an exemplary embodiment of a process 900 for synchronizing multiple redundant computers shown in FIG. 6. Multiple CCPUs 24 may be included in power distribution system 10 depending on predetermined requirements. Each CCPU 24 includes similar data structures but, only data structures included in one CCPU are described herein. Additionally, a similar data flow diagram is embodied in each node electronics unit 20, which operates in a manner similar to that described herein. CCPU 24 receives external input timing signals 902 from external timing sources 904 located remote from CCPU 24. Timing signals as used herein refer to a timing clock pulse, and to signals whose arrival indicates a timing event and that includes a timing portion in a message. For example, a timing signal may be a message 64 bits long that includes a first group of bits indicating a sequence number and a second group of bits indicating a relative timestamp. A component or data structure receiving the timing signal may record a local time that the timing signal was received, parse the information within the timing signal, and verify its own clock's operation based on the timing information received in the timing signal. Additionally, a component or data structure may receive multiple timing signals from multiple sources and use an algorithm to determine a health and status of its own clock or any other clock from which it has received an input signal. In the exemplary embodiment, external timing sources 904 may include a hardware clock wherein input signals 902 may include a sequence number six bits long to sixteen bits long, another CCPU 24, and an auxiliary source external to system 10.

CCPU 24 also receives internal timing signals 906 from internal timing sources 908 located internal to CCPU 24, for example, but, not limited to a processor clock. Each of at least one selectors 910 receives input timing signals 902 and 906, and a plurality of selection parameters 912. Selection parameters 912 are used by selector 910 to determine which of input signals 902 and 906 are used as a primary source for generating an output signal 914. In the exemplary embodiment, selection parameters 912 may be used to determine an order of preference of sources 904 and 908, and a criteria to be used for determining a presence of input signals 902 and 906 within an expected time window, determining an absence of input signals 902 and 906, determining invalid input signals 902 and 906, and determining noisy input signals 902 and 906. To determine an expected time window, selector 910 may use a watchdog timer. If selector 910 determines one of input signals 902 and 906 does not meet criteria indicated by selection parameters 912, selector 910 may generate and transmit correction generator signals 916 which, are input to a corrector function 918. Corrector function 918 determines a timing error signal 920 based on correction generator signals 916 and an input signal k 922. Input signal k 922 is associated with selection parameters 912 such that selector 910 and corrector function 918 operate cooperatively. Error signal 920 is transmitted to a respective one of sources 902 and 906 which is associated with the input signal error. Each of respective sources 902 and 906 adjusts its respective input signal based on error signal 920.

Input signals 902 and 906 are also received by a reference object 924 that transforms input signals 902 and 906 into a reference signal based on input signals 902 and 906 and an internal algorithm that maintains a reference to absolute time. For example, input signals 902 and 906 may include a sequence number that is six bits long. Each input signal 902 and 906 may arrive at a periodicity of, for example, two-hundred and sixty microseconds. With each sequence number in each input signal 902 and 906 incremented from the sequence number in each previous input signal 902 and 906, the sequence number will turnover in a relatively short period of time. One solution to maintain a unique timing system would be to increase the number of bits used by each sequence number. This solution has the disadvantage of increasing a length of input signals 902 and 906. In the exemplary embodiment, sequence number is six bits long. In alternative embodiments, sequence number may be sixteen bits long. Reference object 924 receives input signals 902 and 906 and transforms them into a transreference signal 928, which includes a reference sequence number including a sufficient number of bits such that a unique time reference is maintained. In the exemplary embodiment, reference sequence number is sixty four bits long. Transreference signal 928 is used locally within CCPU 24 to drive local processes 930 and transmitted over network 22 to node electronics units 20 wherein transreference signal 928 is used as an input signal to each node electronics unit 20 timing process.

The above-described power distribution multiple synchronized redundant computers methods and systems are cost-effective and highly reliable. Each system includes a central control processing unit (CCPU) and networked devices to facilitate protecting a set of switchgear. Multiple redundant computers are synchronized using an external hardware clock with various backups for maintaining synchronization during periods of equipment failure and maintenance. Devices local to each circuit breaker monitor voltage and current signals from sensors located proximate each circuit breaker. The CCPU receives all monitored signals from all devices over the high-speed network. To ensure parameters measured at one node electronics unit corresponds to parameters measured at each other node electronics unit, all CCPUs and all node electronics units within the power distribution system are synchronized to a primary clock. The CCPU may then implement protection and optimization algorithms for each breaker node electronics unit based on global voltage and current signals. Accordingly, the power distribution system hardware clock facilitates protection and optimization of power system operation in a cost-effective and reliable manner.

Exemplary embodiments of power distribution system components are described above in detail. The components are not limited to the specific embodiments described herein, but rather, components of each system may be utilized independently and separately from other components described herein. Each power distribution system component can also be used in combination with other power distribution system components.

While the invention has been described in terms of various specific embodiments, those skilled in the art will recognize that the invention can be practiced with modification within the spirit and scope of the claims.

What is claimed is:

1. A method for synchronizing a plurality of processors within a computer system wherein the computer system includes a plurality of processors, each processor communicatively coupled to a respective network that is independent of each other network, said method comprising:
   receiving a plurality of input signals at a first rate from at least one source;
   transmitting each input signal of the plurality of input signals to a reference object;
   transforming each input signal to a known temporal reference;
   generating a reference signal in each processor based on the transformed input signal wherein each reference signal is in a known temporal relationship with a reference signal in each other processor;
   executing a plurality of processes in each processor based on each respective reference signal, wherein the computer system includes a plurality of node electronic units, each of the plurality of node electronics units communicatively coupled to at least one network;
   transmitting a transreference signal over the network, the transreference signal based on the reference signal;
   executing node electronics unit internal processes based on a first clock;
   receiving the transreference signal at the node electronics unit; and
   executing a referencing process when the transreference signal is received, wherein executing a referencing process further comprises:
   determining a status of the transreference signal based on the first clock;
   recording a receipt time of the transreference signal based on the first clock;
   determining a first clock error based on at least one of the first clock time, the transreference signal, the determined status of the transreference signal, and the order of preference of the processor from which the transreference signal was received;
   adjusting the first clock based on the error calculation; and
   synchronizing node electronics unit processes based on the adjusted first clock.

2. A method in accordance with claim 1 wherein executing a referencing process comprises executing a referencing process using at least one of an internal clock, and an external clock.

3. A method in accordance with claim 2 wherein executing a referencing process comprises executing a referencing process based on the transreference signal as the clock.

4. A method in accordance with claim 1 wherein adjusting the first clock based on the error calculation comprises adjusting the first clock using a phase lock loop (PLL).

5. A method in accordance with claim 1 wherein adjusting the first clock based on the error calculation comprises setting the clock from the transreference signal.

6. A method in accordance with claim 1 further comprising:
   determining a first out-of-sync condition based on the determined error; and
   transmitting the first out-of-sync signal to each processor.

7. A method in accordance with claim 6 wherein transmitting the first out-of-sync signal to each processor comprises transmitting the first out-of-sync signal that includes at least one clock value.

8. A method in accordance with claim 6 further comprising determining an out-of-sync signal for each node electronics unit based on at least one of the first out-of-sync signal, and each processor reference signal.

9. A method in accordance with claim 1 wherein each clock includes a clock sequence number, and wherein determining a first clock error based on the transreference signal comprises determining a first clock error based on the transreference signal wherein the transreference signal includes a transreference sequence number.

10. A method for synchronizing a plurality of processors within a computer system, each processor communicatively coupled to a respective network that is independent of each other network, said method comprising:
    receiving a plurality of input signals at a first rate from at least one source;
    transmitting each input signal of the plurality of input signals to a reference object;
    transforming each input signal to a known temporal reference;
    generating a reference signal in each processor based on the transformed input signal wherein each reference signal is in a known temporal relationship with a reference signal in each other processor; and
    executing a plurality of processes in each processor based on each respective reference signal,
    wherein each processor includes a corrector function and wherein the method further comprises determining a status of a first input signal based on the first input signal and each other input signal, and
    wherein determining a status of a first input signal comprises at least one of determining a presence of the first input signal within an expected time window, determining an absence of the first input signal, determining an invalid first input signal, and determining a noisy first input signal.

11. A method in accordance with claim 10 wherein said receiving a plurality of input signals comprises receiving a plurality of input signals from at least one of a source internal to the processor, and a source internal to any other of the plurality of processors.

12. A method in accordance with claim 10 wherein said receiving a plurality of input signals comprises receiving a plurality of input sequence numbers.

13. A method in accordance with claim 12 wherein said receiving a plurality of input sequence numbers comprises receiving a plurality of input sequence numbers that are at least six bits long.

14. A method in accordance with claim 12 wherein said receiving a plurality of input sequence numbers comprises receiving a plurality of input sequence numbers that are sixteen bits long.

15. A method in accordance with claim 10 wherein said generating a reference signal comprises generating a reference signal that includes a reference sequence number.

16. A method in accordance with claim 15 wherein said generating a reference signal comprises generating a reference signal that includes a reference sequence number sixty-four bits long.

17. A method in accordance with claim 10 wherein the computer system includes a plurality of node electronic units, each of the plurality of node electronics units communicatively coupled to at least one network, and wherein the method further comprises transmitting a transreference signal over the network, the transreference signal based on the reference signal.

18. A method in accordance with claim 17 wherein the node electronics units include at least one clock, and wherein the method further comprises:
    executing node electronics unit internal processes based on a first clock;
    receiving the transreference signal at the node electronics unit; and
    executing a referencing process when the transreference signal is received.

19. A method in accordance with claim 10 wherein determining an absence of the first input signal comprises using a watchdog timer to determine the absence of the first input signal.

20. A method in accordance with claim 10 further comprising:
    determining an input signal error based on the first input signal and each other input signal, and
    transmitting an error signal to a respective source; and
    adjusting each input signal based on the transmitted error signal.

21. A method in accordance with claim 20 wherein adjusting each input signal comprises adjusting each input signal using a phase lock loop at the input signal source.

22. A method in accordance with claim 20 wherein adjusting each input signal comprises adjusting each input signal by setting the source using one other of the input signals.

23. A method in accordance with claim 10 further comprising generating a reference signal based on a transformed input signal wherein the transformation is modified when at least one of the occurrence of a first event and the occurrence of a transition to an unsatisfactory status of at least one input signal.

24. A method in accordance with claim 23 wherein generating a reference signal comprises replacing each unsatisfactory input signal with an available input signal based on the order of preference of input signals.

25. A method in accordance with claim 23 wherein generating a reference signal comprises generating a reference signal wherein the first event is a loss of at least one input signal.

26. A method for synchronizing a plurality of processors within a computer system wherein the computer system includes a plurality of processors, each processor communicatively coupled to a respective network that is independent of each other network, said method comprising:
    receiving a plurality of input signals at a first rate from at least one source;
    transmitting each input signal of the plurality of input signals to a reference object;
    transforming each input signal to a known temporal reference;
    generating a reference signal in each processor based on the transformed input signal wherein each reference signal is in a known temporal relationship with a reference signal in each other processor;
    executing a plurality of processes in each processor based on each respective reference signal, wherein each processor includes a corrector function;
    determining a status of a first input signal based on the first input signal and each other input signal; and
    generating a reference signal based on a transformed input signal wherein the transformation is modified when at least one of the occurrence of a second event and the occurrence of a transition to a satisfactory status of at least one input signal.

27. A method in accordance with claim 26 wherein generating a reference signal comprises replacing an available input signal with a satisfactory input signal based on the order of preference of input signals.

28. A method in accordance with claim 26 wherein generating a reference signal comprises generating a reference signal wherein the second event is a restoration of at least one input signal.

29. A method in accordance with claim 26 wherein generating a reference signal comprises generating a reference signal based on an error signal generated by the corrector function.

30. Apparatus for synchronizing a plurality of processors within a computer system, said computer system comprising a plurality of processors, each said processor communicatively coupled to a respective network that is independent of each other network, said apparatus comprising:
    means for receiving a plurality of input signals at a first rate from at least one source;
    means for transmitting the input signals to a reference object;
    means for transforming the input signal to a known temporal reference;
    means for generating a reference signal in each processor based on the transformed input signal wherein each reference signal is in a known temporal relationship with a reference signal in each other processor;
    means for executing a plurality of processes in each processor based on each respective reference signal,
    wherein said computer system further comprises a plurality of node electronic units, each of said plurality of node electronics units communicatively coupled to at least one network, and wherein the apparatus further comprises means for transmitting a transreference signal over the network, the transreference signal based on the reference signal, wherein each said node electronics units comprises at least one clock, and wherein said apparatus further comprises:

means for executing node electronics unit internal processes based on a first clock;

means for receiving the transreference signal at the node electronics unit; and means for executing a referencing process when the transreference signal is received;

means for determining a status of the transreference signal based on the first clock;

means for recording a receipt time of the transreference signal based on the first clock;

means for determining a first clock error based on at least one of the first clock time, the transreference signal, the determined status of the transreference signal, and the order of preference of the processor from which the transreference signal was received;

means for adjusting the first clock based on the error calculation; and means for synchronizing node electronics unit processes based on the adjusted first clock.

31. Apparatus in accordance with claim 30 further comprising means for executing a referencing process using at least one of an internal clock, and an external clock.

32. Apparatus in accordance with claim 31 further comprising means for executing a referencing process based on the transreference signal as the clock.

33. Apparatus in accordance with claim 30 further comprising means for adjusting the first clock using a phase lock loop (PLL).

34. Apparatus in accordance with claim 30 further comprising means for setting the clock from the transreference signal.

35. Apparatus in accordance with claim 30 further comprising:

means for determining a first out-of-sync condition based on the determined error; and means for transmitting the first out-of-sync signal to each processor.

36. Apparatus in accordance with claim 35 further comprising means for transmitting the first out-of-sync signal wherein the signal comprises at least one clock value.

37. Apparatus in accordance with claim 35 further comprising means for determining an out-of-sync signal for each node electronics unit based on at least one of the first out-of-sync signal, and each processor reference signal.

38. Apparatus in accordance with claim 30 wherein each clock includes a clock sequence number, and wherein said apparatus further comprises means for determining a first clock error based on the transreference signal wherein the transreference signal includes a transreference sequence number.

39. Apparatus for synchronizing a plurality of processors within a computer system, each processor of said plurality of processors being communicatively coupled to a respective network that is independent of each other network, said apparatus comprising:

means for receiving a plurality of input signals at a first rate from at least one source;

means for transmitting the input signals to a reference object;

means for transforming the input signal to a known temporal reference;

means for generating a reference signal in each processor based on the transformed input signal wherein each reference signal is in a known temporal relationship with a reference signal in each other processor;

means for executing a plurality of processes in each processor based on each respective reference signal; wherein each processor includes a corrector function and wherein said apparatus further comprises means for determining a status of a first input signal based on the first input signal and each other input signal; and at least one selected from the groups consisting of: means for determining a presence of the first input signal within an expected time window, means for determining an absence of the first input signal, means for determining an invalid first input signal, and determine a noisy first input signal, wherein each processor includes a corrector function and wherein said apparatus further comprises means for determining a status of a first input signal based on the first input signal and each other input signal.

40. Apparatus in accordance with claim 39 further comprising means for receiving a plurality of input signals from at least one of a source internal to said processor, and a source internal to any other of said plurality of processors.

41. Apparatus in accordance with claim 39 further comprising means for receiving a plurality of input sequence numbers.

42. Apparatus in accordance with claim 41 further comprising means for receiving a plurality of input sequence numbers that are at least six bits long.

43. Apparatus in accordance with claim 41 further comprising means for receiving a plurality of input sequence numbers that are sixteen bits long.

44. Apparatus in accordance with claim 39 further comprising means for generating a reference signal that includes a reference sequence number.

45. Apparatus in accordance with claim 44 further comprising means for generating a reference signal that includes a reference sequence number sixty-four bits long.

46. Apparatus in accordance with claim 39 wherein said computer system further comprises a plurality of node electronic units, each of said plurality of node electronics units communicatively coupled to at least one network, and wherein the apparatus further comprises means for transmitting a transreference signal over the network, the transreference signal based on the reference signal.

47. Apparatus in accordance with claim 46 wherein each said node electronics units comprises at least one clock, and wherein said apparatus further comprises:

means for executing node electronics unit internal processes based on a first clock;

means for receiving the transreference signal at the node electronics unit; and means for executing a referencing process when the transreference signal is received.

48. Apparatus in accordance with claim 39 further comprising means for using a watchdog timer to determine the absence of the first input signal.

49. Apparatus in accordance with claim 39 further comprising:

means for determining an input signal error based on the first input signal and each other input signal, and means for transmitting an error signal to a respective source; and means for adjusting each input signal based on the transmitted error signal.

50. Apparatus in accordance with claim 49 further comprising means for adjusting each input signal using a phase lock loop at the input signal source.

51. Apparatus in accordance with claim 49 further comprising means for adjusting each input signal by setting the source using one other of the input signals.

52. Apparatus in accordance with claim 39 further comprising means for generating a reference signal based on a transformed input signal wherein the transformation is modified when at least one of the occurrence of a first event and the occurrence of a transition to an unsatisfactory status of at least one input signal.

53. Apparatus in accordance with claim 52 further comprising means for replacing each unsatisfactory input signal with an available input signal based on the order of preference of input signals.

54. Apparatus in accordance with claim 52 wherein the first event is a loss of at least one input signal.

55. Apparatus in accordance with claim 39 further configured to generate a reference signal based on a transformed input signal wherein the transformation is modified when at least one of the a second event occurs, and a transition to a satisfactory status of at least one input signal occurs.

56. Apparatus in accordance with claim 55 further comprising means for replacing an available input signal with a transitioned to satisfactory input signal based on the order of preference of input signals.

57. Apparatus in accordance with claim 55 wherein the second event is a restoration of at least one input signal.

58. Apparatus in accordance with claim 55 further comprising means for generating a reference signal based on an error signal generated by the corrector function.

59. A method for synchronizing a plurality of processors within a computer system, each processor communicatively coupled to a respective network that is independent of each other network, said method comprising:

generating a first input signal in a first timing source, said first timing source being external to said plurality of processors;

generating a second input signal in a second timing source internal to each particular processor;

transmitting said first input signal to a reference object and a correction function in each of said plurality of processors;

transmitting said second input signal to said reference object and said correction function in said particular processor;

transforming said first and second input signals into a transreference signal in said reference object in said particular processor;

determining a timing error signal in said correction function in said particular processor; and transmitting said timing error signal to said first and second timing sources.

60. A method in accordance with claim 59 further comprising using said transreference signal to drive local processes within said particular processor.

61. A method in accordance with claim 59 further comprising:

transmitting said transreference signal over the network to a plurality of node electronic units in the computer system; and executing node electronics unit internal processes based on a first clock;

receiving said transreference signal at said plurality of node electronics unit; and executing a referencing process when said transreference signal is received.

* * * * *